US009025046B2

(12) United States Patent
Lin

(10) Patent No.: US 9,025,046 B2
(45) Date of Patent: May 5, 2015

(54) METHOD FOR WHITE BALANCE ADJUSTMENT

(71) Applicant: Hon Hai Precision Industry Co., Ltd., New Taipei (TW)

(72) Inventor: Kuo-Hung Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 69 days.

(21) Appl. No.: 13/906,354

(22) Filed: May 31, 2013

(65) Prior Publication Data

US 2014/0118573 A1 May 1, 2014

(30) Foreign Application Priority Data

Oct. 25, 2012 (TW) .............................. 101139409 A

(51) Int. Cl.
*H04N 9/73* (2006.01)
(52) U.S. Cl.
CPC ..................................... *H04N 9/735* (2013.01)
(58) Field of Classification Search
USPC ................................. 348/223.1; 358/515, 516
See application file for complete search history.

(56) References Cited

U.S. PATENT DOCUMENTS

| 6,995,791 | B2 * | 2/2006 | Skow ........................... 348/223.1 |
| 2006/0203311 | A1 * | 9/2006 | Weng et al. .................... 358/516 |
| 2011/0205389 | A1 * | 8/2011 | Zhang .......................... 348/223.1 |
| 2012/0050563 | A1 * | 3/2012 | Cote et al. ................... 348/223.1 |
| 2014/0118574 | A1 * | 5/2014 | Lin ............................. 348/223.1 |

* cited by examiner

*Primary Examiner* — Sinh Tran
*Assistant Examiner* — Zhenzhen Wu
(74) *Attorney, Agent, or Firm* — Novak Druce Connolly Bove + Quigg LLP

(57) ABSTRACT

A white balance adjustment method includes capturing a raw image where an arrangement format of the raw image is BGb/GrR, extracting color scale values of each color channels, and obtaining cumulative proportion of color scale values in each channel. Cumulative proportion of each channels are compared with default minimum and maximum values, to get a cumulative proportion which is above a maximum value treated as a reference white, and a cumulative proportion below the minimum value treated as a reference black. The color scale values are re-quantized according to the obtained reference white and black, by using a color histogram equalization method.

4 Claims, 6 Drawing Sheets

| B | Gb | B | Gb | B | Gb |
|---|----|---|----|---|----|
| Gr | R | Gr | R | Gr | R |
| B | Gb | B | Gb | B | Gb |
| Gr | R | Gr | R | Gr | R |
| B | Gb | B | Gb | B | Gb |
| Gr | R | Gr | R | Gr | R |

FIG. 3

METHOD FOR WHITE BALANCE ADJUSTMENT

BACKGROUND

1. Technical Field

The present disclosure relates to an image processing technology, and in particular, to a white balance process for color digital images.

2. Description of Related Art

Generally speaking, colors that reflect off an object depend on color of the light sources. A human brain is able to detect and correct this type of color change. Whether during a sunny day, a cloudy day, or in a room with light bulbs or fluorescent lamps, a human eye can adapt to the changes in color under different light sources and it will not affect the way in which humans perceive white objects. However, "white color" generated by different light sources is perceived differently by a digital image capturing device. For example, a photo tends to be yellowish if it is taken in a room illuminated with tungsten lamps (light bulbs), and it tends to be lightly bluish or reddish if it is taken in other environments. In order to make the colors in the photos consistent with the colors perceived by human eye, the digital image capturing device has to mimic the human brain and adjust the colors according to the light source. It has to define the white color so that it is the same in the photos as it is in the white color perceived by the human eyes. This type of adjustment is known as "white balance."

In prior art, a color histogram stretching (CHS) method is used to adjust the white balance for the image, raw histograms of red (R), green (G), and blue (B) three channels are re-quantized to a range of 0-255, adjusted result shows that this method has characteristics with smaller error and immediacy. However, this method does not take into account a converted image contrast, therefore, the image after white balance process often has low contrast, and the details of the image are very easily hidden. Therefore, it is necessary to provide a white balance adjustment method which maintains a high image contrast.

BRIEF DESCRIPTION OF THE DRAWINGS

FIG. 3 is a schematic arrangement of a raw image pixel.

DETAILED DESCRIPTION

Figure 1:
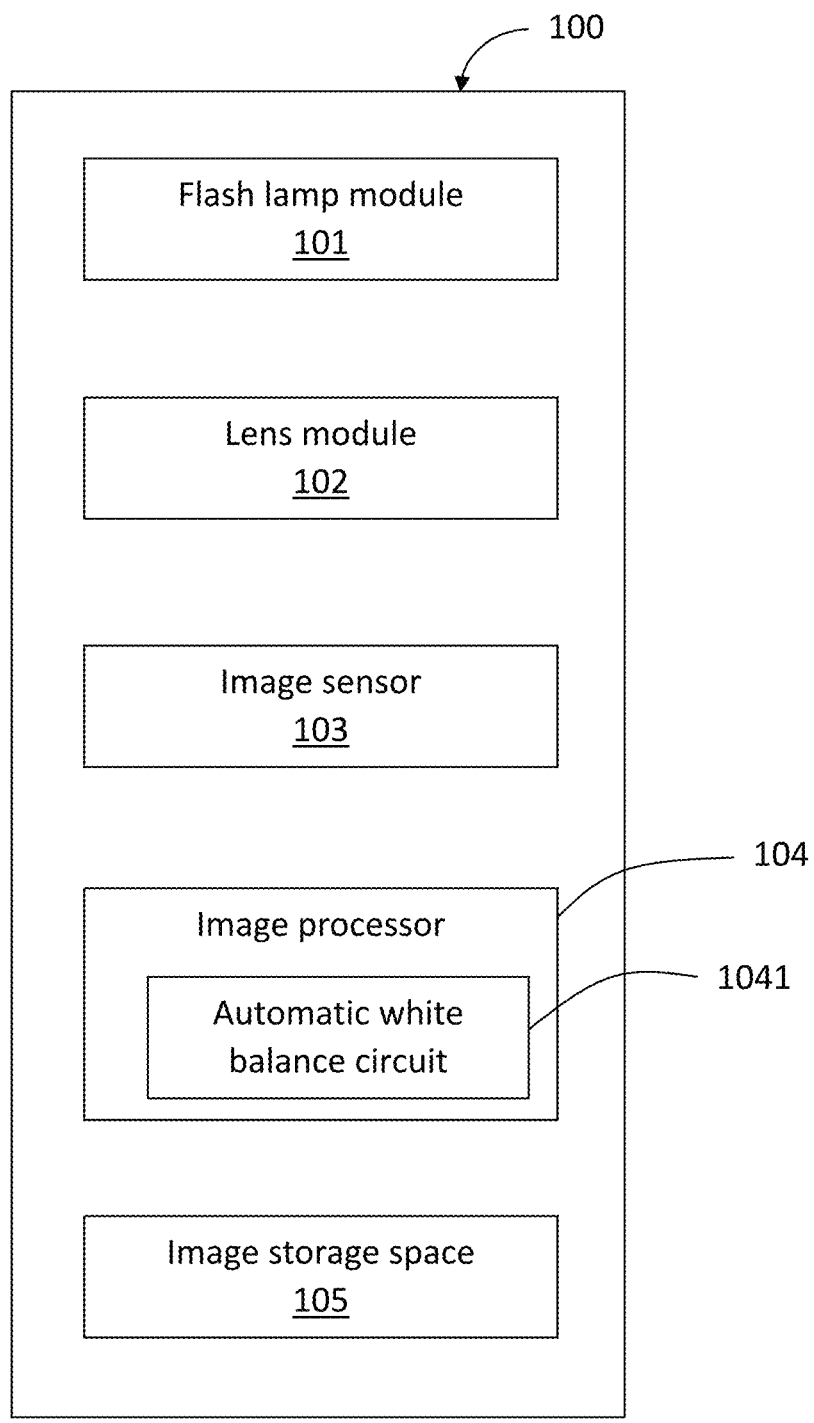
FIG. 1 is an image capturing device using the white balance adjustment method of the present embodiment.

In FIG. 1, an image capturing device 100 using the white balance adjustment method of the present embodiment includes a lens module 102, an image sensor 103, a image processor 104, and an image storage space 105. The image sensor 103 is electrically connected to the image processor 104. The lens module 102 and the image sensor 103 cooperatively capture an image, the image processor 104 receives the image from the image sensor 103, and the image storage space 105 is used to store a processed image. The image storage space 105 may be physical storage space, such as flash memory or random access memory, or a cache.

The image processor 104 has an automatic white balance circuit 1041 to perform the white balance adjustment method of the present embodiment. The image capturing device 100 further includes a flash lamp module 101.

Figure 2:
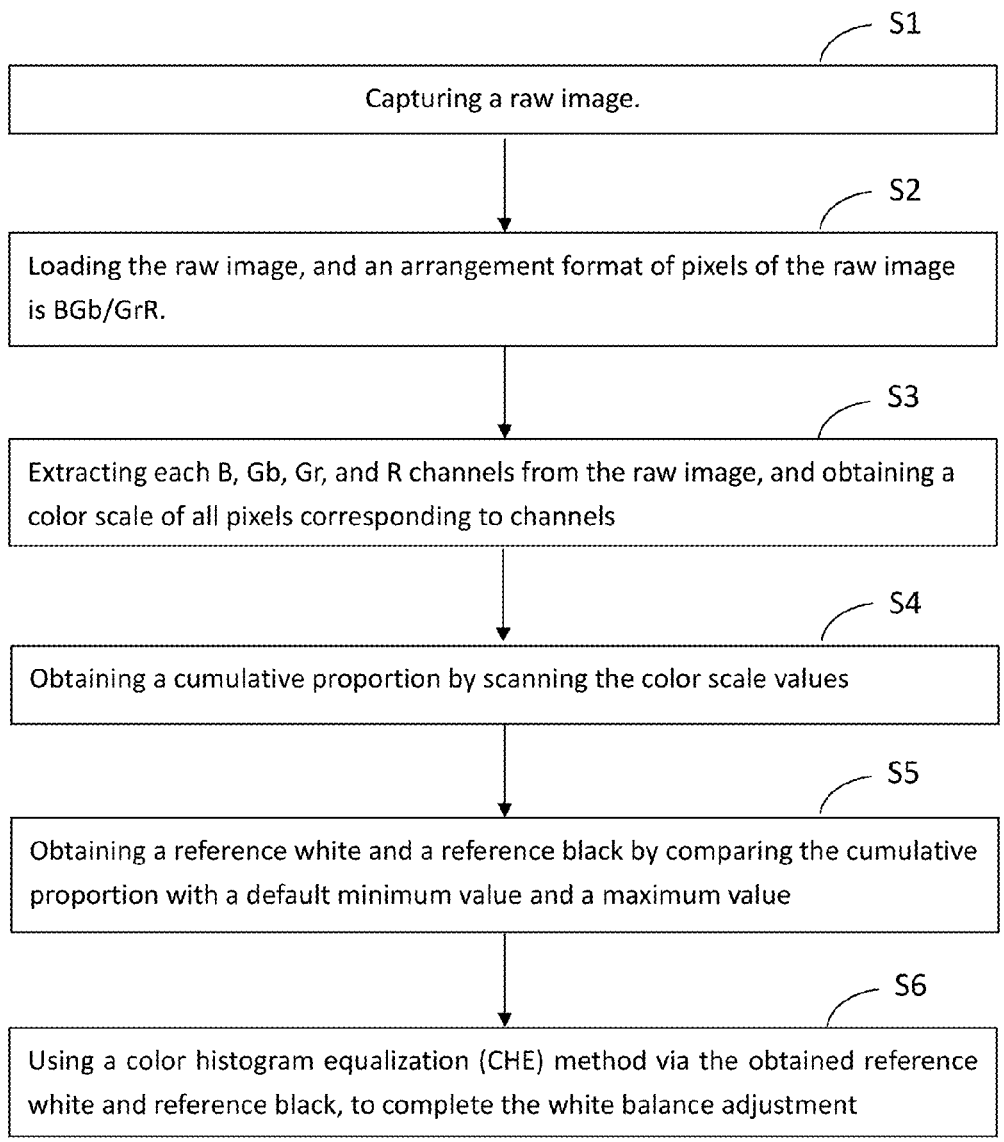
FIG. 2 is a flowchart of the present embodiment of a white balance adjustment method.

FIG. 2 shows a white balance adjustment method of the present disclosure. In this embodiment, the white balance adjustment method is used to adjust white balance for an image. The white balance adjustment method for the image capturing device 100, includes the following steps:

In step S1, a raw image is captured by the image capturing device 100.

In step S2, raw image is loaded, and an arrangement format of pixels of the raw image is BGb/GrR.

In step S3, each B, Gb, Gr, and R channels from the raw image are extracted, and color scale values of all pixels corresponding to channels are obtained.

In step S4, separately scan the color scale values of all pixels in B, Gb, Gr, and R channels, and record a number of pixels corresponding to each color scale value, then cumulative proportion of each color scale values in B, Gb, Gr, and R channels are obtained.

In step S5, the cumulative proportion of each B, Gb, Gr, and R channels are compared with a default minimum value and a default maximum value, to get a cumulative proportion which is greater than or equal to the maximum value and a cumulative proportion which is less than or equal to the minimum value, the cumulative proportion which is greater than or equal to the maximum value corresponding to an average value of the color scale values is a reference white; the cumulative proportion which is less than or equal to the minimum value corresponding to an average value of the color scale values is a reference black.

In step S6, the color scale values of each B, Gb, Gr, and R channels are re-quantized, according to the reference white and the reference black, by using a color histogram equalization (CHE) method, to complete the white balance adjustment.

With reference to FIG. 3, in step S1, the raw image comprises a plurality of pixels ("raw" here means "unprocessed", the raw image comprising original and unprocessed data), and then, in the manner of a color filter placed over the image sensor, a "Bayer Pattern" can be obtained as shown in FIG. 3, that is BR/GR (in present embodiment represented as BGb/GrR) format; in other words, when odd-numbered lines of pixel are arranged in BGBGBG form, then the even-numbered lines of pixel are arranged in GRGRGR form, alternatively, when odd-numbered lines of pixels are arranged in GRGRGR form, then the even-numbered lines of pixels are arranged in BGBGBG form, where Gb is the G of the BGBG, and Gr is the G of the GRGR.

In step S3, separately scan each pixel to obtain color scale values of first pixel to the last pixel of each B, Gb, Gr, and R, and R channels. There is no limit to obtain sequence of the color scale values of channel pixels, it can be according to a channel sequence of B, Gb, Gr, and R, or a channel sequence of R, Gb, Gr, and B, it can also be other sequences. If 8 bits represent each pixel, then the color scale value is in a range of 0-255; if 10 bits represent each pixel, then the color scale value is in a range of 0-1023. In summary, the range of the color scale values of all pixels is $[0, 2^n-1]$, where "n" is a number of bits of the pixel.

In step S4, scan all of the color scale values of pixels of the R channel, and a number of pixels corresponding to all of the color scale values are recorded. A calculation method of the cumulative proportion is $$F(n) = \sum_{i=0}^{n} p(x_i),$$

where n=0, 1, 2, 3 ... 255 or 1203. According to the calculation method of the cumulative proportion, when the color value is 255 or 1023 the cumulative proportion will be 1, and each cumulative proportion corresponds to a color scale value. There is no limit to obtain sequence of cumulative proportions of each color scale value of the B, Gb, Gr, and R channels.

In step S5, the maximum value and the minimum value of each of the B, Gb, Gr, and R channels can be customized by the user, the maximum and minimum values of different channels may be the same or different. In the present embodiment, a default minimum value of each channel is defined as 0.01 and a default maximum value of each channel is defined as 0.99. All of the cumulative proportions of R channel in the step S4 are compared with the maximum value and the minimum value, all of the cumulative proportions which are less than or equal to the minimum value are obtained, and all of the cumulative proportions which are greater than or equal to the maximum value are obtained. The cumulative proportion which is greater than or equal to the maximum value corresponding to an average value of the color scale values is the reference white; the cumulative proportion which is less than or equal to the minimum value corresponding to an average value of the color scale values is the reference black. The B, Gb, and Gr channels are processed using the same method as for the R channel, using their own cumulative proportion to obtain a reference white and a reference black for each channel.

In step S6, according to the reference black and the reference white of R channel, using the color histogram equalization (CHE) to re-quantize an original color scale value corresponding to the cumulative proportion of R channel which is located between the minimum value and the maximum value, to obtain a histogram of R channel after white balance adjustment.

The reference white is re-defined as the maximum value "$2^n-1$" of an adjusted color scale value (generally 255 or 1023), the reference black is re-defined as the minimum value "0" of an adjusted color scale value, using following formula to re-quantize the color scale value corresponding to the cumulative proportion of the R channel which is located between the maximum value and the minimum value, $$\frac{C-L}{(2^n-1)-L}(2^n-1),$$

where "C" is the color scale value corresponding to the cumulative proportion of the R channel which is located between the maximum value and the minimum value, and "L" is the color scale value corresponding to the reference black. Using the same method as applied to the R channel, according to the respective references black and the references white, to obtain a histogram corresponding to each channel after white balance adjustment.

Figure 4A:
FIG. 4A is an image that is before white balance adjustment.
Figure 4B:
FIG. 4B is an image that has achieved white balance adjustment by using a color histogram stretching (CHS) method.
Figure 4C:
FIG. 4C is an image that has achieved white balance adjustment by using a white balance adjustment method.

The image shown in FIG. 4A is actually bluish, the reason human eyes detect the color as white is because they correct the color. The image after the white balance process by using color histogram stretching (CHS) method will produce a more satisfactory image like FIG. 4B, but with low contrast. The image after the present white balance adjustment process is shown in FIG. 4C, the reference white and the reference black can be obtained by using a probability calculation, and with color histogram equalization method, thus rendering a high contrast image after white balance has been adjusted, and the details of the image are more attractive and more easily deciphered.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:
1. A white balance adjustment method for processing a color digital image, the method comprising:
   S1: capturing a raw image using an electronic device;
   S2: an arrangement format of pixels of the raw image is BGb/GrR;
   S3: extracting each B, Gb, Gr, and R channels from the raw image, and obtaining color scale values of all pixels corresponding to each channels;
   S4: separately scanning the color scale values of all pixels in B, Gb, Gr, and R channels, and recording a number of pixels corresponding to each color scale values, and obtaining cumulative proportion of each color scale values in B, Gb, Gr, and R channels;
   S5: comparing the cumulative proportion of each B, Gb, Gr, and R channels with a default minimum value and a maximum value, to get a cumulative proportion which is greater than or equal to the maximum value and a cumulative proportion which is less than or equal to the minimum value, the cumulative proportion which is greater than or equal to the maximum value corresponding to an average value of the color scale values is a reference white; the cumulative proportion which is less than or equal to the minimum value corresponding to an average value of the color scale values is a reference black; and
   S6: re-quantizing the color scale values of each B, Gb, Gr, and R channels, according to the reference white and the reference black, by using a color histogram equalization (CHE) method.
2. The white balance adjustment method as claimed in claim 1, wherein the minimum value is 0.01, the maximum value is 0.99.
3. The white balance adjustment method as claimed in claim 1, wherein a range of the color scale values of all pixel is [0, $2^n-1$], where "n" is a number of bits of the pixel.
4. The white balance adjustment method as claimed in claim 1, wherein the re-quantized color scale value by using the color histogram equalization (CHE) method is

$$\frac{C-L}{(2^n-1)-L}(2^n-1),$$

where "C" is the color scale values corresponding to the cumulative proportions of B, Gb, Gr, and R channels which are located between the maximum value and the minimum value, "L" is the color scale value corresponding to the reference black, "n" is a number of bits of the pixel.

* * * * *